(12) United States Patent
Singh et al.

(10) Patent No.: US 8,918,855 B2
(45) Date of Patent: Dec. 23, 2014

(54) TRANSACTION PROVISIONING FOR MOBILE WIRELESS COMMUNICATIONS DEVICES AND RELATED METHODS

(75) Inventors: Ravi Singh, Toronto (CA); Neil Patrick Adams, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 53 days.

(21) Appl. No.: 13/315,622

(22) Filed: Dec. 9, 2011

(65) Prior Publication Data

US 2013/0152185 A1 Jun. 13, 2013

(51) Int. Cl.
G06F 21/00 (2013.01)

(52) U.S. Cl.
USPC ............................................................ 726/9

(58) Field of Classification Search
USPC ............ 726/9, 10, 15, 20, 21; 705/52, 55, 56, 705/64, 65, 67, 69, 72, 73, 76, 77; 713/172–174, 185; 902/2, 3, 4, 5, 26, 902/27, 41
See application file for complete search history.

(56) References Cited

U.S. PATENT DOCUMENTS

| | | | | |
|---|---|---|---|---|
| 5,903,882 A * | 5/1999 | Asay et al. | ...................... | 705/44 |
| 6,061,557 A * | 5/2000 | Lazaridis et al. | ............... | 455/406 |
| 7,641,111 B2 * | 1/2010 | Adams et al. | ................. | 235/380 |
| 7,996,324 B2 * | 8/2011 | Bishop et al. | ................... | 705/64 |
| 8,078,885 B2 * | 12/2011 | Jobmann | ....................... | 713/186 |
| 8,108,318 B2 * | 1/2012 | Mardikar | ....................... | 705/65 |
| 8,112,787 B2 * | 2/2012 | Buer | ................................ | 726/2 |
| 8,135,647 B2 * | 3/2012 | Hammad et al. | ................ | 705/67 |
| 8,150,772 B2 * | 4/2012 | Mardikar et al. | ............... | 705/64 |
| 8,240,560 B2 * | 8/2012 | Adams et al. | ................. | 235/380 |
| 8,327,429 B2 * | 12/2012 | Speyer et al. | ..................... | 726/9 |
| 2006/0165060 A1 * | 7/2006 | Dua | .............................. | 370/352 |
| 2007/0125838 A1 * | 6/2007 | Law et al. | ..................... | 235/379 |
| 2007/0155443 A1 * | 7/2007 | Cheon et al. | .................. | 455/572 |
| 2007/0299773 A1 * | 12/2007 | Soderstrom | ..................... | 705/39 |
| 2008/0048022 A1 * | 2/2008 | Vawter | ......................... | 235/380 |
| 2008/0058014 A1 * | 3/2008 | Khan et al. | ..................... | 455/558 |
| 2008/0121696 A1 | 5/2008 | Mock et al. | ................... | 235/380 |
| 2008/0208742 A1 * | 8/2008 | Arthur et al. | ..................... | 705/41 |
| 2009/0037333 A1 * | 2/2009 | Flitcroft et al. | ................. | 705/44 |
| 2009/0103732 A1 * | 4/2009 | Benteo et al. | ................. | 380/270 |
| 2009/0143104 A1 * | 6/2009 | Loh et al. | ...................... | 455/558 |
| 2009/0164322 A1 * | 6/2009 | Khan et al. | ....................... | 705/14 |
| 2009/0192935 A1 * | 7/2009 | Griffin et al. | ................... | 705/41 |
| 2009/0307142 A1 * | 12/2009 | Mardikar | ........................ | 705/72 |
| 2010/0058463 A1 | 3/2010 | Bertin | | |

(Continued)

FOREIGN PATENT DOCUMENTS

EP 2159763 3/2010

*Primary Examiner* — Dede Zecher
*Assistant Examiner* — Richard McCoy
(74) *Attorney, Agent, or Firm* — Allen, Dyer, Doppelt, Milbrath & Gilchrist, P.A.

(57) ABSTRACT

A mobile communications device may include a memory, a transceiver, and a controller coupled with the memory and the transceiver. The controller may be capable of receiving first authentication data from a security token via communication with the security token, where the first authentication data is associated with an account. The controller may also be capable of transmitting the first authentication data via the transceiver, and receiving second authentication data via the transceiver, where the second authentication data is also associated with the account. The controller may be further capable of storing the second authentication data in the memory, and transmitting a transaction request using the second authentication data.

15 Claims, 10 Drawing Sheets

(56) References Cited

U.S. PATENT DOCUMENTS

| | | | |
|---|---|---|---|
| 2010/0088227 A1* | 4/2010 | Belamant | 705/41 |
| 2010/0131347 A1* | 5/2010 | Sartipi | 705/14.33 |
| 2010/0131415 A1* | 5/2010 | Sartipi | 705/75 |
| 2010/0138652 A1* | 6/2010 | Sela et al. | 713/158 |
| 2010/0293613 A1* | 11/2010 | Hum | 726/20 |
| 2011/0117966 A1* | 5/2011 | Coppinger | 455/558 |
| 2011/0140841 A1* | 6/2011 | Bona et al. | 340/5.83 |
| 2011/0165836 A1* | 7/2011 | Dixon et al. | 455/41.1 |
| 2011/0166936 A1* | 7/2011 | Dixon et al. | 705/14.58 |
| 2011/0202466 A1* | 8/2011 | Carter | 705/67 |
| 2011/0208656 A1* | 8/2011 | Alba et al. | 705/65 |
| 2011/0218911 A1* | 9/2011 | Spodak | 705/41 |
| 2011/0237223 A1* | 9/2011 | Coppinger | 455/411 |
| 2011/0237224 A1* | 9/2011 | Coppinger | 455/411 |
| 2011/0237296 A1* | 9/2011 | Coppinger | 455/558 |
| 2011/0238510 A1* | 9/2011 | Rowen et al. | 705/16 |
| 2011/0238579 A1* | 9/2011 | Coppinger | 705/67 |
| 2011/0238580 A1* | 9/2011 | Coppinger | 705/67 |
| 2011/0244920 A1* | 10/2011 | Coppinger | 455/558 |
| 2011/0246317 A1* | 10/2011 | Coppinger | 705/17 |
| 2011/0314539 A1* | 12/2011 | Horton | 726/20 |
| 2012/0030121 A1* | 2/2012 | Grellier | 705/67 |
| 2012/0172026 A1* | 7/2012 | Kwon et al. | 455/419 |
| 2012/0238206 A1* | 9/2012 | Singh et al. | 455/41.1 |
| 2012/0252359 A1* | 10/2012 | Adams et al. | 455/41.1 |
| 2012/0254031 A1* | 10/2012 | Walker et al. | 705/42 |
| 2012/0290376 A1* | 11/2012 | Dryer et al. | 705/14.23 |
| 2013/0080238 A1* | 3/2013 | Kelly et al. | 705/14.31 |

\* cited by examiner

TRANSACTION PROVISIONING FOR MOBILE WIRELESS COMMUNICATIONS DEVICES AND RELATED METHODS

TECHNICAL FIELD

This application relates to the field of communications, and more particularly, to mobile wireless communications systems and related methods.

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices usually allow electronic mail (email) messages to be sent and received wirelessly, as well as access the internet via a cellular network and/or a wireless local area network (WLAN), for example.

Some mobile devices incorporate contactless card technology and/or near field communication (NFC) chips. NFC technology is commonly used for contactless short-range communications based on radio frequency identification (RFID) standards, using magnetic field induction to enable communication between electronic devices, including mobile wireless communications devices. This short-range high frequency wireless communications technology exchanges data between devices over a short distance, such as only a few centimeters.

DETAILED DESCRIPTION

Figure 1:
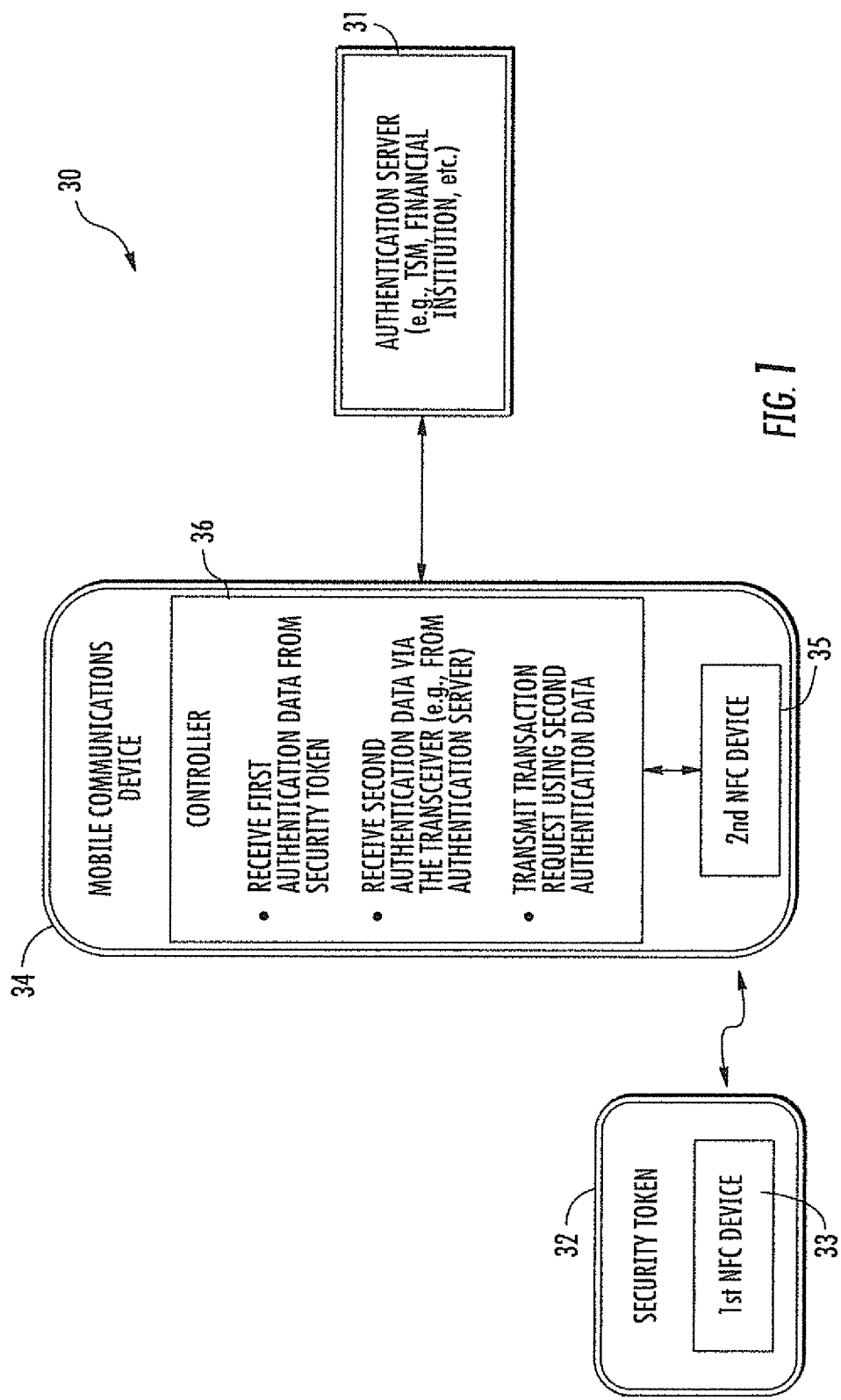
FIG. 1 is a schematic block diagram of a communications system in accordance with one example aspect.

The present description is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Generally speaking, a mobile communications device is provided herein which may include a memory, a transceiver, and a controller coupled with the memory and the transceiver. The controller may be capable of receiving first authentication data from a security token via communication with the security token, where the first authentication data is associated with an account. The controller may also be capable of transmitting the first authentication data via the transceiver, and receiving second authentication data via the transceiver, where the second authentication data is also associated with the account. The controller may be further capable of storing the second authentication data in the memory, and transmitting a transaction request using the second authentication data.

More particularly, the mobile communications device may further include a near field communication (NFC) device coupled with the controller, and the controller may be capable of receiving the first authentication data through NFC communication with the security token via the NFC device. By way of example, the memory may comprise a secure element. Also by way of example, the transaction request may comprise a secure payment transaction request, an EMV (Europay, Mastercard and Visa) transaction request, a physical access transaction request, etc. In some example embodiments, the first authentication data may comprise a first primary account number (PAN), the second authentication data may comprise a second PAN different than the first PAN, and the first PAN and the second PAN may both be associated with the account.

In accordance with an example embodiment, the second authentication data may comprise a cryptographic key. Furthermore, the security token may also have a cryptographic key associated therewith, and the first authentication data may be generated based upon the cryptographic key. The mobile communications device may further include an input device coupled with the controller, and the controller may be further capable of receiving verification data via the input device. By way of example, the verification data may comprise a personal identification number (PIN), biometric data, etc. One example security token may comprise an Integrated Circuit Card (ICC). Other example security token embodiments may comprise a credit card, a debit card, etc.

A related communications method for a mobile communications device, such as the one described briefly above, is also provided. The method may include receiving first authentication data from a security token via communication with the security token, where the first authentication data is associated with an account, and transmitting the first authentication data via the transceiver. The method may further include receiving second authentication data via the transceiver, where the second authentication data is associated with the account, storing the second authentication data in the memory, and transmitting a transaction request using the second authentication data.

A related non-transitory computer-readable medium is for a mobile communications device, such as the one described briefly above. The non-transitory computer-readable medium may have computer-executable instructions for causing the mobile communications device to perform steps including receiving first authentication data from a security token via communication with the security token, where the first authentication data is associated with an account, and transmitting the first authentication data via the transceiver. The steps may further include receiving second authentication data via the transceiver, where the second authentication data is associated with the account, storing the second authentication data in the memory, and transmitting a transaction request using the second authentication data.

A related communications system is also provided and may include a security token, a server, and a mobile wireless communications device, such as the one described briefly above.

Figure 2:
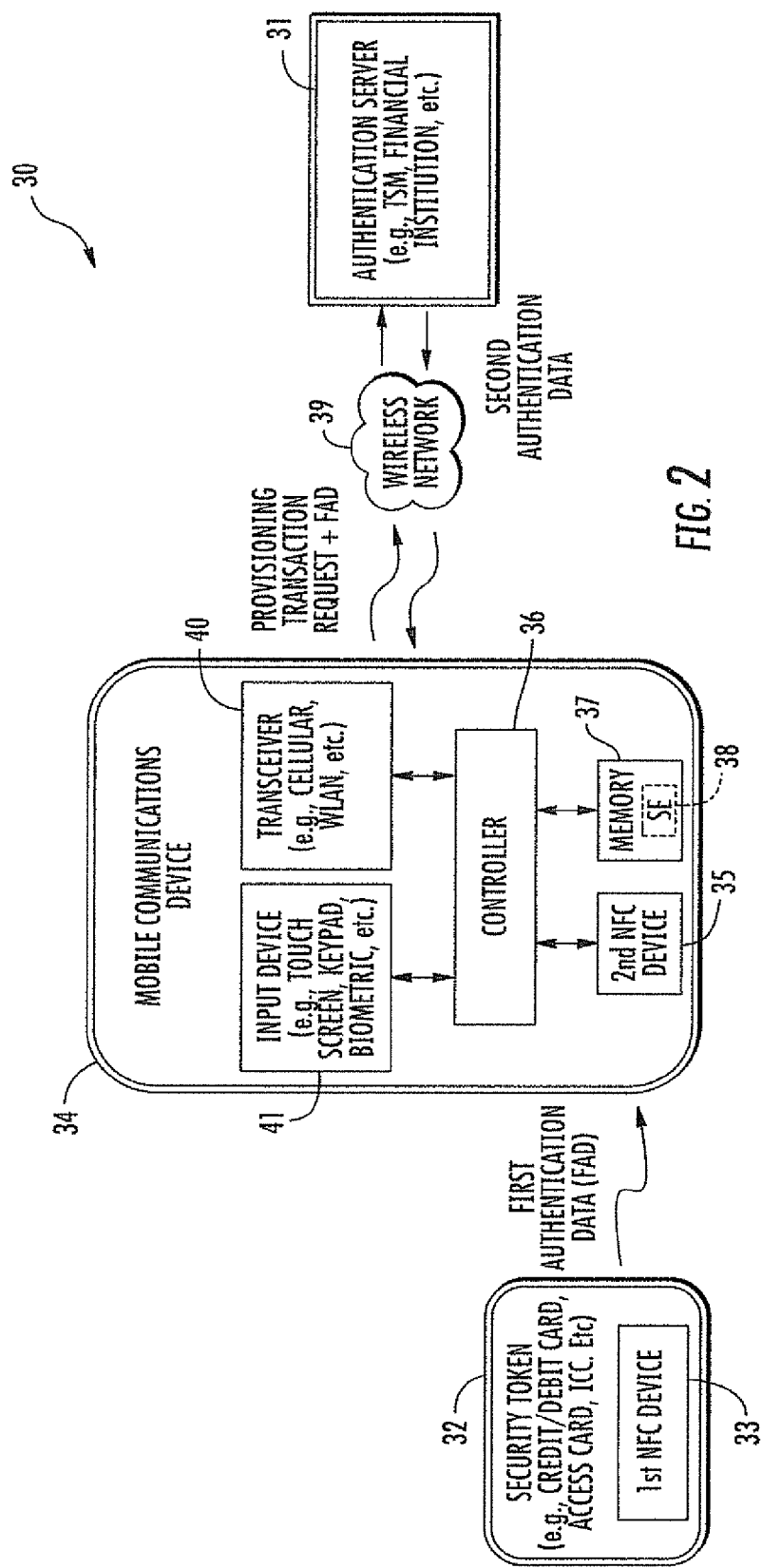
FIG. 2 is a schematic block diagram of the communications system of FIG. 1 in accordance with another example aspect.

Referring initially to FIGS. 1 and 2, a communications system 30 illustratively includes an authentication server 31 configured to perform secure transactions based upon receiving authentication data, and a security token 32 comprising a first NFC device 33. The security token 32 may be capable of providing first authentication data to the authentication server 31 to cause the authentication server 31 to perform a transaction, as will be discussed further below.

By way of background, NFC is a short-range wireless communications technology in which NFC-enabled devices are "swiped," "bumped" or otherwise moved in close proximity to communicate. In one non-limiting example implementation, NFC may operate at 13.56 MHz and with an effective range of several centimeters (typically up to about 4 cm, or up to about 10 cm, depending upon the given implementation), but other suitable versions of near field communication which may have different operating frequencies, effective ranges, etc., for example, may also be used.

In accordance with one example implementation, the authentication server 31 may comprise a secure payment server which is capable of performing secure payment transactions. For example, the authentication server 31 may be provided by a bank or financial institution for authorizing credit or debit transactions using an account, and the security token 32 may be a credit or debit card issued by the bank or financial institution and associated with the account. The security token 32 may be swiped at a NFC-enabled point of sale (POS) terminal, for example, which would communicate the appropriate authentication data from the security token 32 to the authentication server 31 so that the authentication server may authorize payment for the requested transaction from the account. More particularly, the first authentication data may include information such as credit card information, a primary account number (PAN), an expiration date, debit card information, gift card information, reward card information, a personal identification number (PIN), a cryptographic key, etc. In some embodiments, challenge-response data may be generated by the security token 32 using a cryptographic key, from which the authentication server may verify that the security token 32 is valid, for example.

Another example implementation of the security token 32 and authentication server 31 is for physical access applications. That is, the authentication server may be configured to perform a physical access security transaction, such as permitting access to a building, parking garage, or other secured area, based upon receiving the authentication data from the security token 32. Still another example implementation is for access to or payment for transportation, such as subways, trains, busses, etc. In such embodiments the first authentication data would include the appropriate transportation card or physical access card information.

The system 30 further illustratively includes a mobile wireless communications device 34 (also referred to as a "mobile device" herein) comprising a second NFC device 35, a memory 37, a transceiver 40 (e.g., a cellular, WLAN, WiMAX, etc.), and an input device 41 (e.g., a touch screen, keypad, biometric sensor, buttons, etc.). The second NFC device 35, memory 37, transceiver 40, and the input device 41 are coupled with a controller 36. Example mobile devices 34 may include portable or personal media players (e.g., music or MP3 players, video players, book readers, etc.), portable gaming devices, portable or mobile telephones, smartphones, portable computers such as tablet computers, digital cameras, etc. The controller 36 may be implemented using a processor and a non-transitory computer-readable medium with computer-executable instructions configured to perform the various operations described herein, for example.

Generally speaking, the controller 36 may be provisioned to initiate secure transactions via NFC, such as payment or security transactions, in a similar manner to that described above for the security token 32. This is sometimes referred to as a mobile wallet or an electronic ("e-wallet") configuration, allowing the mobile device 34 to be used similar to a credit card or security card that would ordinarily be carried in a wallet. In accordance with one embodiment, provisioning of the mobile device 34 or mobile wallet may include installing a secure applet on a element (SE) 38 defined on a memory 37 of the mobile device 34 (see FIG. 2), and personalizing the applet for a particular user account, such as through a trusted service manager (TSM). This may be done by accessing the authentication server 31 through a Web browser, for example, which in turn may cause a TSM to provision the mobile device 34 for the given type of transaction (e.g., payment, physical access, etc.). The TSM may be associated with the same financial institution, etc., as the authentication server 31, or it may associated with a different entity (e.g., a mobile device manufacturer or provider, a network carrier, etc.). The memory 37 may comprise a subscriber identity module (SIM) card, an electronic universal integrated circuit card (eUICC), a removable memory, an SD card, an embedded memory, etc., for example.

Figure 3:
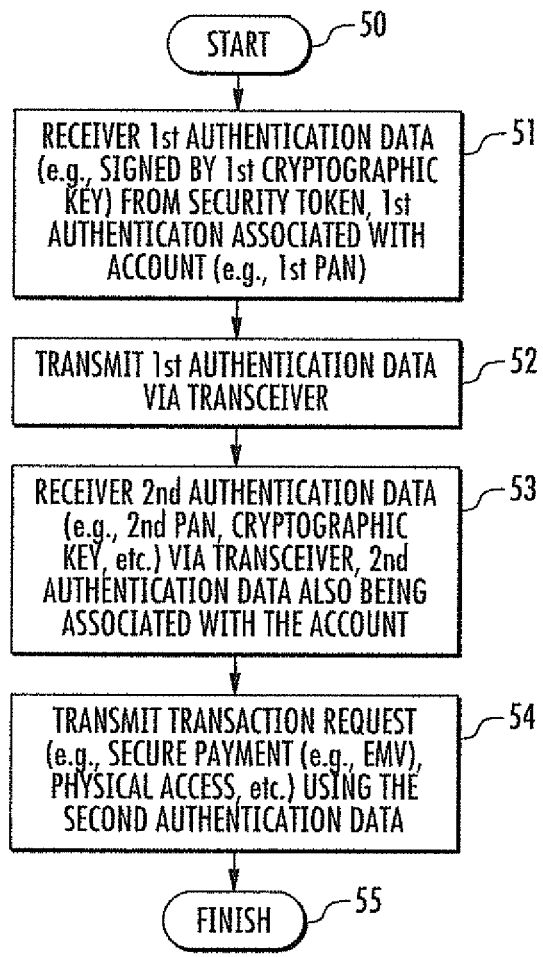
FIG. 3 is a flow diagram illustrating method aspects associated with the communications system of FIGS. 1 and 2.

Referring additionally to FIG. 3, in the case of the security token 32, the owner of the security token already has an established account associated with the security token. In accordance with an example embodiment, beginning at Block 50, the mobile device 34 may advantageously receive the first authentication data from the security token 32, at Block 51, and use this data for provisioning the mobile device 34 to perform the same type of transactions as the security token and using the same account associated with the security token. Stated alternatively, the mobile device 34 may advantageously be provisioned to request transactions using the account just as if it were the security token 32 itself (i.e., using the same account associated with the security token), but without using the security token to initiate the transaction request.

This advantageously allows the mobile device 34 to be used for future transactions, without having to separately carry the security token 32, and without having to issue a new account to the mobile device 34, which may otherwise be a significant inconvenience to users. That is, the system 30 advantageously makes use of an existing security token 32 to relatively easily provision the mobile device 34 to initiate transactions based upon the same account already associated with the security token as part of the mobile device's e-wallet, and thus allowing users to not carry the physical security token if they so choose. Moreover, this may be particularly advantageous for financial institutions or security entities as well, as they may avoid the necessity to issue new security tokens 32 to customers after e-wallet provisioning, and may instead take advantage of existing security tokens. This, in turn, may save money and allow deployment in a relatively quick and convenient manner. Moreover, this may also help avoid the need to physically enter a bank or other location in person to provision the mobile device 34 with a payment or security card applet, or perform such provisioning via a website (and manually typing in information, etc.), both of which may be inconvenient and time consuming.

In an example embodiment, the mobile device 34 may be provisioned to initiate transactions for multiple security tokens 32. For example, the mobile device 34 may be provisioned to perform transactions for which a debit card is needed, the mobile device 34 may be further provisioned to perform transactions for which a credit card is needed, and the mobile device 34 may be further provisioned to perform transactions for which an access control card is needed. In this example, the debit card, the credit card and the access control card need not be carried because after provisioning the mobile device 34 is capable of either emulating each of these cards, or using a same account associated with these cards in a similar manner.

More particularly, the controller 36 may receive the first authentication data from the security token 32 via NFC communication between the first NFC device 33 and the second NFC device 35. However, it should be noted that other forms of communication between the mobile device 34 and the security token 32 may be used in some embodiments, such as radio frequency identification (RFID), WALN, infrared, wired connections, etc.). By way of example, the security token 32 may be swiped with, tapped against, or otherwise positioned in close proximity to the mobile device 34 to initiate NFC communication between the first NFC device 33 and the second NFC device 35. The second NFC device 35 may be configured as an active NFC device 35 in that it generates a field to detect the presence of another NFC device within an effective NFC communication range. The effective NFC communication range may vary based upon the type of NFC communication format being used (e.g., A, B, F, etc.), as noted above. Moreover, the first NFC device 33 may be a passive NFC device in that it is powered by the field emitted from the second NFC device 35, and therefore does not require a separate power source of its own. However, it should be noted that the first NFC device 33 may be active and the second NFC device 35 may be passive, or both may be active, in some embodiments.

The mobile device 34 may function as or simulates a POS or security terminal to the security token 32, in that it prompts the security token 32 to provide the first authentication data, which the security token 32 would otherwise provide when initiating or requesting a secure transaction with the authentication server 31. The controller 36 may then initiate or execute a transaction for provisioning purposes by transmitting the first authentication data to the authentication server 31 via the transceiver 40, at Block 52. For example, this transmission may take the form of a transaction request to the authentication server 31 against or on behalf of the security token 32, similar to what a POS or security terminal would perform. In the example illustrated in FIG. 2, the controller 36 communicates with the authentication server 31 via a wireless communications network 39 (e.g., a cellular network, wireless LAN network, etc.), although in some embodiments this communication may occur through a wired connection as well.

The authentication server 31 may determine that the transmission from the mobile device 34 is not for the purpose of making a purchase, etc., but instead a request to provision the mobile device 34, as will be described further below. As such, the authentication server 31 may verify that the information being presented by the mobile device 34 is the proper first authentication data associated with the security token 32, similar to the way it would if the security token 32 was being used for a typical financial transaction, etc. This also confirms that the mobile device 34 requesting provisioning is in physical proximity of the security token 32, which suggests that the user of the mobile device 34 possesses the security token 32 as well. That is, this prevents provisioning based upon stolen credit card numbers without physical possession of a respective physical credit card. As will be discussed further below, a further security measure of matching the registered user of the mobile device 34 with the registered credit card holder to make sure they are the same may also be performed, so that a physical credit card issued to a given user may only be used to provision the mobile device 34 for the same given user. As noted above, this process may involve back-and-forth communication for verification purposes, such as a challenge-response, etc.

As such, the authentication server 31 may provide, or cause a TSM to provide, second authentication data to the mobile device 34 that may be stored in the secure element 38 and used by the mobile device for requesting future transactions from the authentication server 31, at Blocks 53-54, which concludes the illustrated method (Block 55). That is, the mobile device 34 may then initiate future payment (or security, transportation, etc.) transactions as if it were the security token 32 itself (i.e., using the same account already associated with the security token). It should be noted that, while the security token 32 and the mobile device 34 may both be associated with a same account, they do not have to have identical numbers associated therewith (although they may be identical in some embodiments). For example, the security token 32 may have a first PAN associated therewith, and the mobile device 34 may have a second PAN associated therewith, but both the first and second PANs may be associated with a same account at the given financial institution (e.g., both PANs are linked with a same user, family, etc., account, for example).

The foregoing will be further understood with reference to FIGS. 4-8 and an implementation example relating to secured payments. In the example, the security token 32 is a NFC-enabled VISA credit card issued by XYZ Bank to user Joe Smith. More particularly, the security token 32 is configured for secure payments in accordance with the Europay, MasterCard and VISA (EMV) standard, although other suitable payment or security formats besides EMV and payment card types may be used in various embodiments. Accordingly, the controller 36 may be configured to appear as an EMV-enabled POS terminal to the security token 32, and the security token 32 will respond accordingly to the mobile device 34 as if the mobile device 34 were any other EMV POS terminal once NFC communication is initiated between the first NFC device 33 and the second NFC device 35.

Figure 4:
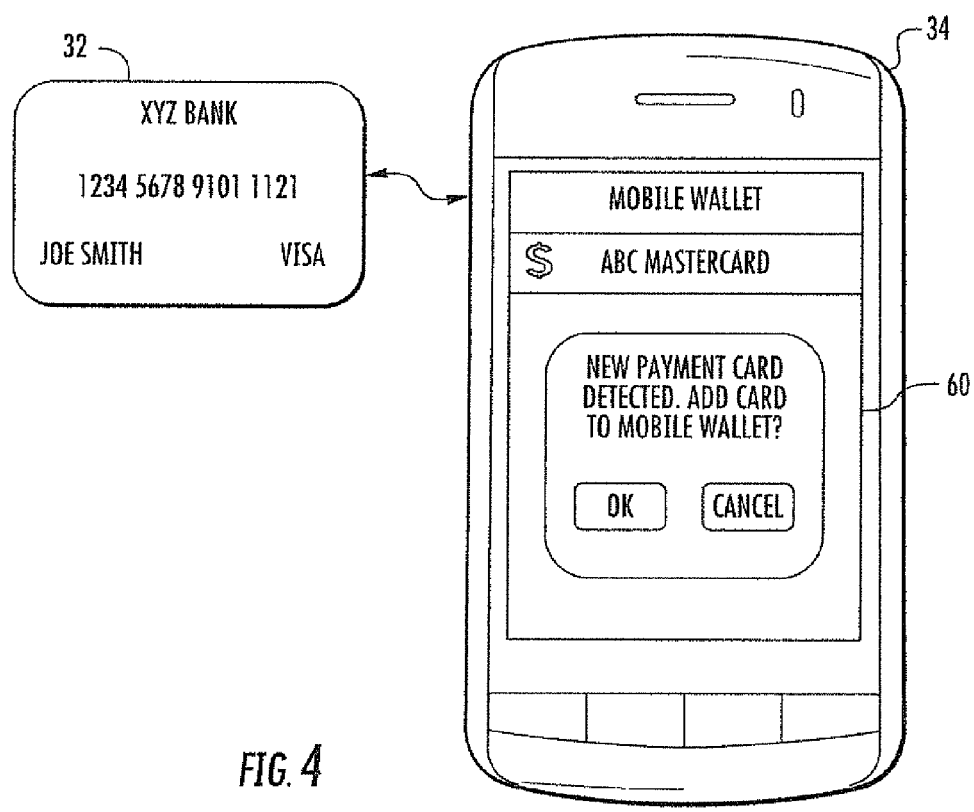
FIGS. 4-9 are a series of front views of a mobile wireless communications device illustrating provisioning operations in accordance with an example embodiment.
Figure 5:
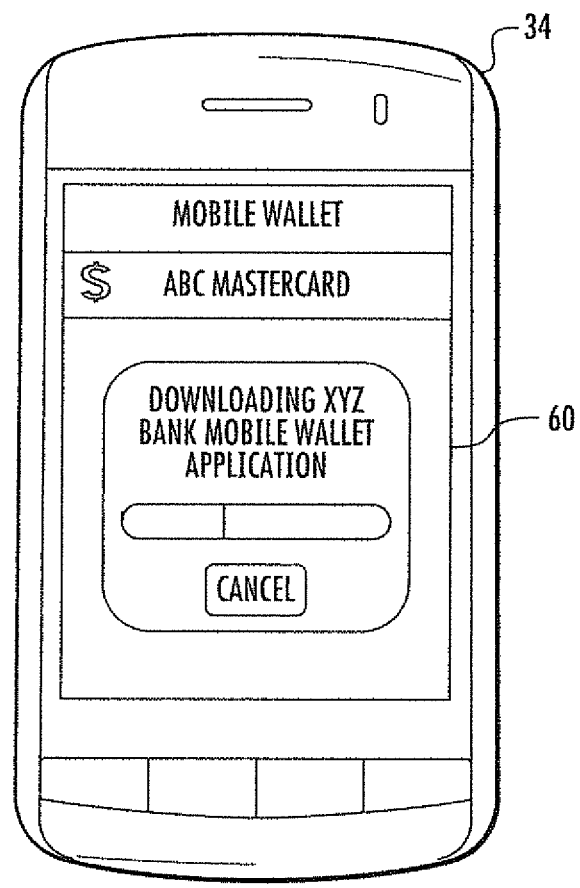

As shown in FIG. 4, the mobile device 34 illustratively includes a display 60, which in the example is a touch screen display, although other suitable displays may be used in other embodiments. The controller 36 is running a mobile wallet application, which provides a graphical user interface (GUI) on the display 60. In the mobile wallet, a first "soft" debit card is already provisioned, namely a debit credit card from ABC Bank. When the security token 32 and mobile device 34 commence NFC communications, the mobile wallet application determines that the security token 32 is a credit card that is not already provisioned with the mobile wallet, and provides a GUI prompt inquiring whether this new credit card is to be added to the mobile wallet. For example, the mobile wallet may determine, based upon an PAN number of the security token 32, bank identification information, or other information stored on the security token 32 the type of credit card with which it is communicating. From this information, the mobile wallet may determine not only that the credit card is not already provisioned with the mobile wallet, but it may also determine a location (e.g., website, etc.) from which to download a mobile wallet interface application for the given credit card, as shown in FIG. 5.

For example, website addresses from which to download respective bank payment applications for the mobile wallet may be stored in a database on the mobile device 34, or on a separate server with which the mobile device communicates. In accordance with another example, the appropriate website address for downloading the mobile wallet payment application may be stored on the security token 32 and provided to the mobile device 34 via NFC communication. In still another example embodiment, such applications may be stored on a central server which the mobile device 34 looks to for downloading interface applications whenever a new card is to be added to the mobile wallet.

Figure 6:
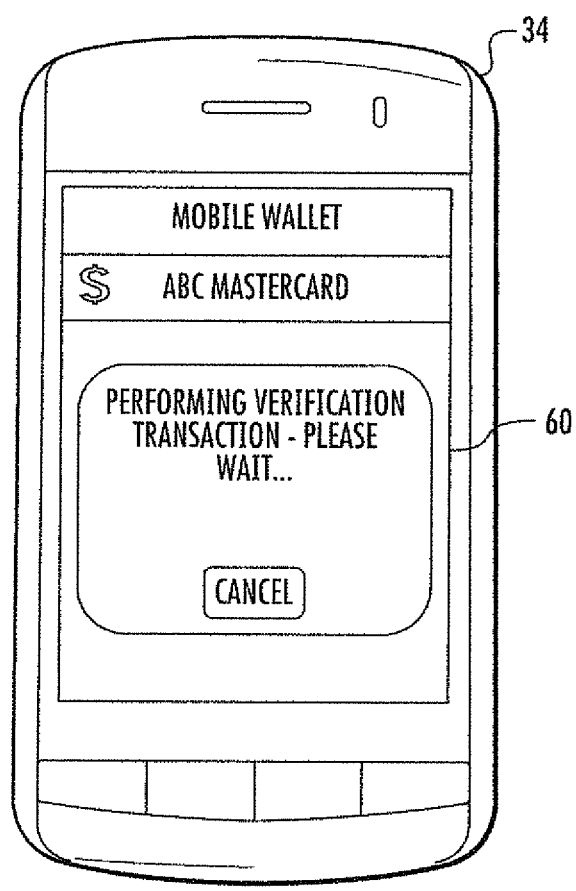
Figure 7:
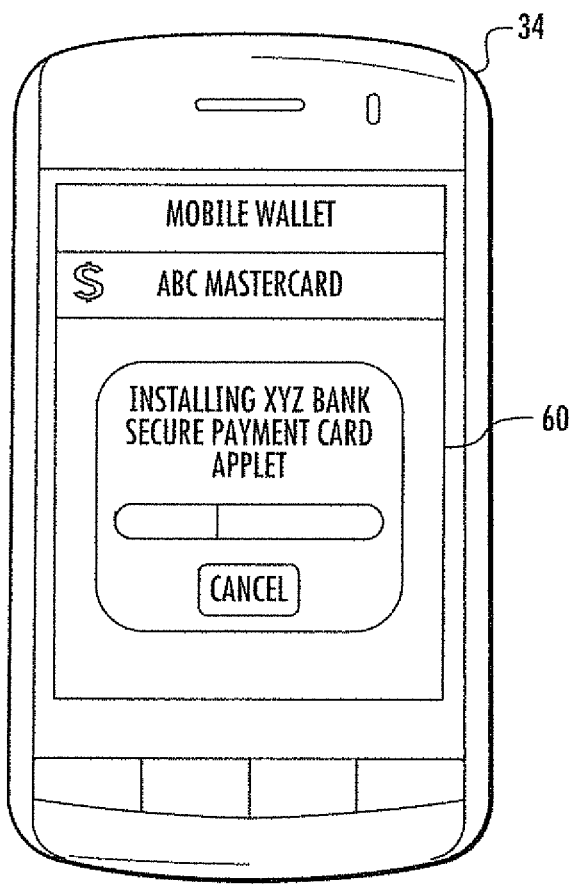
Figure 8:
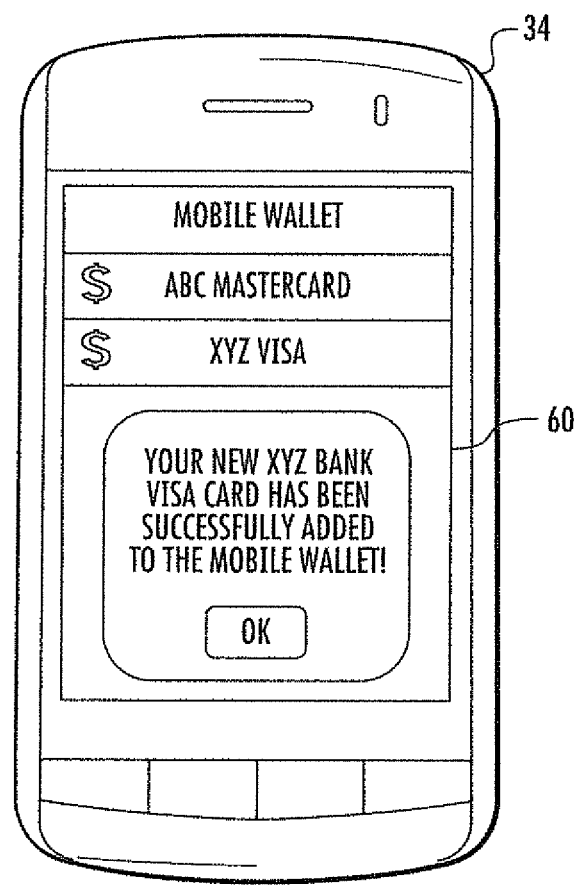

The installed mobile wallet interface application for the XYZ credit card may then initiate an EMV payment verification transaction with the authentication server 31 to download a secure payment applet for the secure element 38 (see FIG. 6). For example, the EMV transaction may be for a nominal or designated amount (e.g., 1 cent), for example, although in some embodiments a transaction amount is not required. That is, the transaction may be designated as a special provisioning request (either by a designated transaction amount or otherwise) that will be recognized by the authentication server 31. The controller 36 receives the first authentication data and any other information typically provided by the security token 32 for payment transactions from the security token via NFC communication. In the example implementation, this information may be stored in the memory 37 (or a different device memory), and is designated as data set "A" herein. The data set A may be processed using a security algorithm (e.g., a hash algorithm), and a security key that is unique to the secure element 38 may be used to "sign" this data (e.g., as a media access control (MAC) data set), which is designated as data set "B" herein. The data set B may be used as an input for the secure element 38.

Furthermore, an ID associated with the secure element 38 (designated as a data set "C") may be submitted by the controller 36 to the authentication server 31 along with the data sets A and B and the transaction request. The authentication server 31, in conjunction with a mobile network carrier or mobile data service provider (e.g., the device manufacturer, etc.), where appropriate, may use the data set A to cryptographically ensure that the user of the mobile device 34 is the same user to which the security token 32 was issued. By way of example, this determination may be made based upon a phone number or IMEI number, in the case that the mobile device 34 is a mobile phone or cellular device. However, with other types of mobile devices (e.g., MP3 players, etc.), a unique identification (ID) associated with the mobile device may be used to determine a user associated with the mobile device (e.g., by communication between the mobile device 34 and an internet-connected computer, via a WLAN connection, etc.), and whether this is the same user to which the security token 32 was issued.

Moreover, with data sets B and C the authentication server 31 may cryptographically ensure that the user physically possessed the secure element 38 (i.e., the mobile device 34) and the security token 32 at the time the security token 32 was scanned, as no other secure element would be able to produce the same output without having access to the given security token. This may be done with a relatively high degree of confidence that the authorized user possessed the physical security token 32, and optionally that the user associated with mobile device 34 is the same user that is associated with the security token 32.

Figure 9:
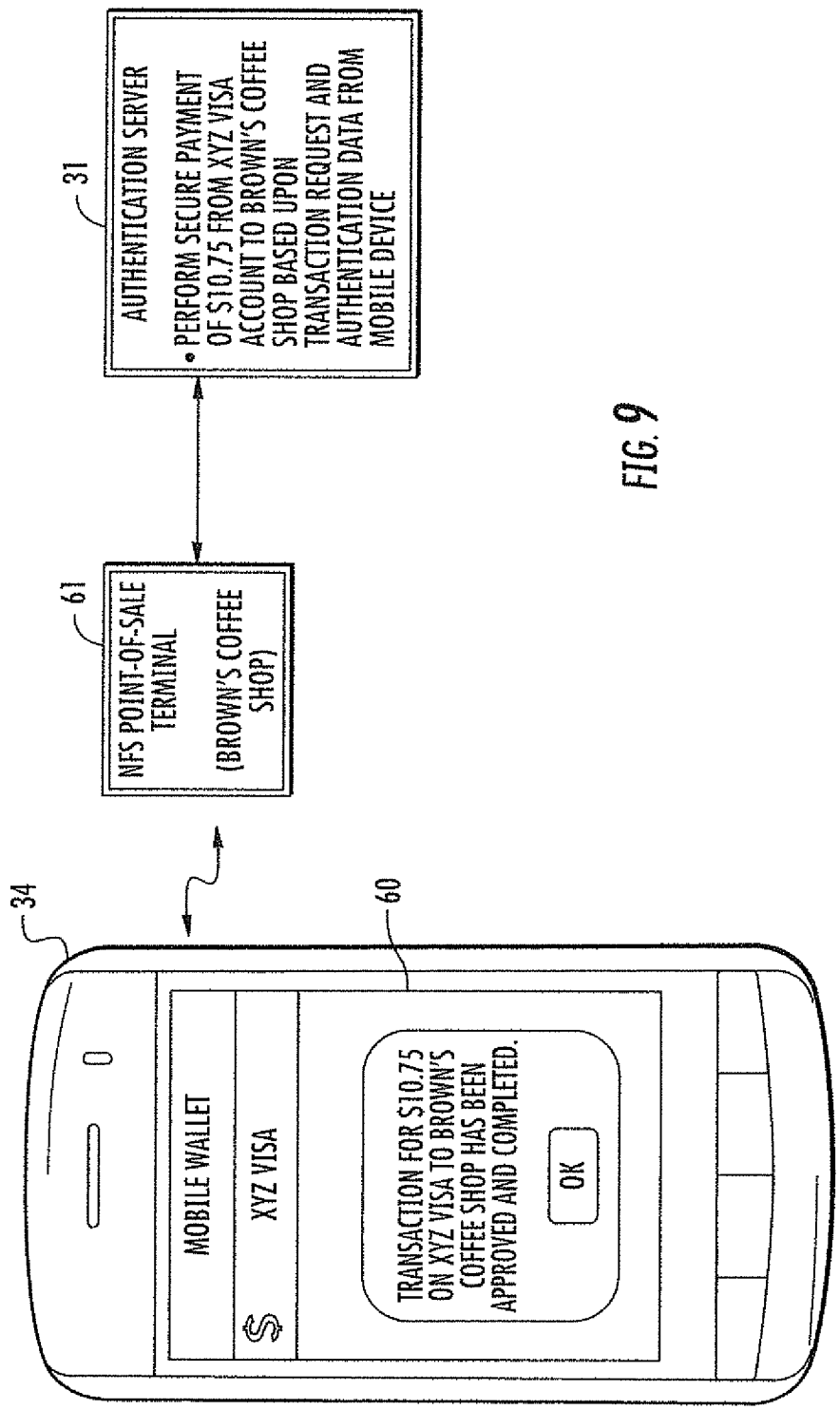

Once the new XYZ VISA payment card is provisioned with the mobile wallet (see FIG. 7), a user may proceed to make a payment by selecting this card from the mobile wallet GUI and bringing the mobile device 34 within NFC communication range of an NFC-enabled point-of-sale (POS) terminal 61, as shown in FIG. 9. Here, the POS terminal 61 is associated with a merchant named Brown's Coffee Shop, and the mobile wallet displays a confirmation message via the GUI that a transaction for $10.75 from the XYZ Bank VISA account to Brown's Coffee Shop has been approved and completed by the authentication server 31. The POS terminal 61 and the authentication server 31 may communicate over the internet via a wired or wireless network, for example.

Example components of a mobile wireless communications device 1000 that may be used in accordance with the above-described embodiments are further described below with reference to FIG. 10. The device 1000 illustratively includes a housing 1200, a keyboard or keypad 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 10:
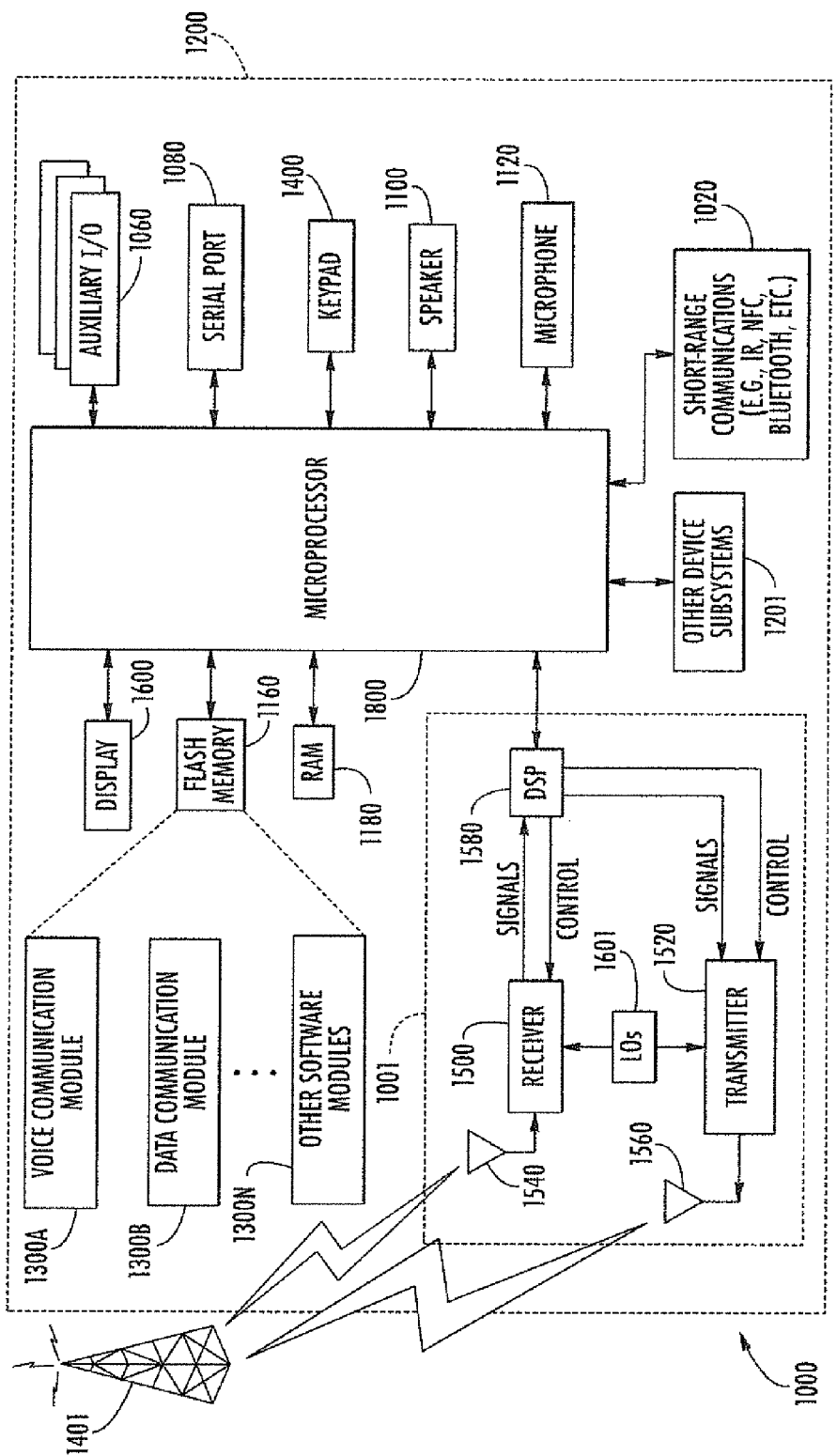
FIG. 10 is a schematic block diagram illustrating example mobile wireless communications device components that may be used with the mobile devices shown in FIGS. 1, 2, and 4-9.

In addition to the processing device 1800, other parts of the mobile device 1000 are shown schematically in FIG. 10. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or a near field communications (NFC) sensor for communicating with a NFC device or NFC tag via NFC communications.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A mobile communications device comprising:
a secure element memory;
a near field communication (NFC) device;
a wireless transceiver; and
a controller coupled with the secure element memory, the NFC device, and the wireless transceiver, the controller being configured to
receive payment account authentication data from a payment card via NFC communication with the payment card using the NFC device, the payment account authentication data being associated with a payment account, and the payment card being configured to communicate with at least one point of sale (POS) terminal via NFC communication to perform a payment transaction based upon the payment account,
transmit the payment account authentication data via the wireless transceiver,
receive provisioning data via the wireless transceiver responsive to the payment account authentication data transmitted via the wireless transceiver to provision the secure element memory for performing an NFC payment transaction with the at least one POS terminal using the same payment account associated with the payment card, and
perform the NFC payment transaction with the at least one POS terminal using the provisioned secure element and the NFC device and without using the payment card.

2. The mobile communications device of claim 1 wherein the NFC payment transaction comprises an EMV (Europay, Mastercard and Visa) transaction.

3. The mobile communications device of claim 1 wherein the payment account authentication data comprises a first primary account number (PAN); wherein the provisioning data comprises a second PAN different than the first PAN; and wherein the first PAN and the second PAN are both associated with the payment account.

4. The mobile communications device of claim 1 wherein the provisioning data comprises a cryptographic key.

5. The mobile communications device of claim 1 wherein the payment card has a cryptographic key associated therewith; and wherein the payment account authentication data is generated based upon the cryptographic key.

6. The mobile communications device of claim 1 further comprising an input device coupled with the controller; and wherein the controller is further configured to receive verification data via the input device.

7. The mobile communications device of claim 6 wherein the verification data comprises a personal identification number (PIN).

8. The mobile communications device of claim 6 wherein the verification data comprises biometric data.

9. The mobile communications device of claim 1 wherein the payment card comprises an Integrated Circuit Card (ICC).

10. The mobile communications device of claim 1 wherein the payment card comprises a credit card.

11. The mobile communications device of claim 1 wherein the payment card comprises a debit card.

12. A communications method for a mobile communications device comprising a secure element memory, a near field communication (NFC) device, and a wireless transceiver, the method comprising:

receiving payment account authentication data from a payment card via NFC communication with the payment card using the NFC device, the payment account authentication data being associated with a payment account, and the payment card being configured to communicate with at least one point of sale (POS) terminal via NFC communication to perform a payment transaction based upon the payment account;

transmitting the payment account authentication data via the wireless transceiver;

receiving provisioning data via the wireless transceiver responsive to the payment account authentication data transmitted via the wireless transceiver to provision the secure element memory for performing an NFC payment transaction with the at least one POS terminal using the same payment account associated with the payment card, and;

performing the NFC payment transaction with the at least one POS terminal using the provisioned secure element and the NEC device and without using the payment card.

13. The method of claim 12 wherein the NFC payment transaction comprises an EMV (Europay, Mastercard and Visa) transaction.

14. A non-transitory computer-readable medium for a mobile communications device comprising a secure element memory, a near field communication (NFC) device, and a wireless transceiver, the non-transitory computer-readable medium having computer-executable instructions for causing the mobile communications device to perform steps comprising:

receiving payment account authentication data from a payment card via NFC communication with the payment card using the NFC device, the payment account authentication data being associated with a payment account, and the payment card being configured to communicate with at least one point of sale (POS) terminal via NFC communication to perform a payment transaction based upon the payment account;

transmitting the payment account authentication data via the wireless transceiver;

receiving provisioning data via the wireless transceiver responsive to the payment account authentication data transmitted via the wireless transceiver to provision the secure element memory for performing an NFC payment transaction with the at least one POS terminal using the same payment account associated with the payment card, and;

performing the NEC payment transaction with the at least one POS terminal using the provisioned secure element and the NFC device and without using the payment card.

15. The non-transitory computer-readable medium of claim 14 wherein the NFC payment transaction comprises an EMV (Europay, Mastercard and Visa) transaction.

\* \* \* \* \*